Sept. 8, 1959  W. A. HOIER ET AL  2,902,798
AUTOMATIC TABLE POSITIONING MECHANISM FOR GRINDERS
Filed April 25, 1957  6 Sheets-Sheet 1

INVENTORS
WALTER A. HOIER
JOHN R. BAKER
BY
*L. W. Wright & H. T. Keiser*

ATTORNEYS

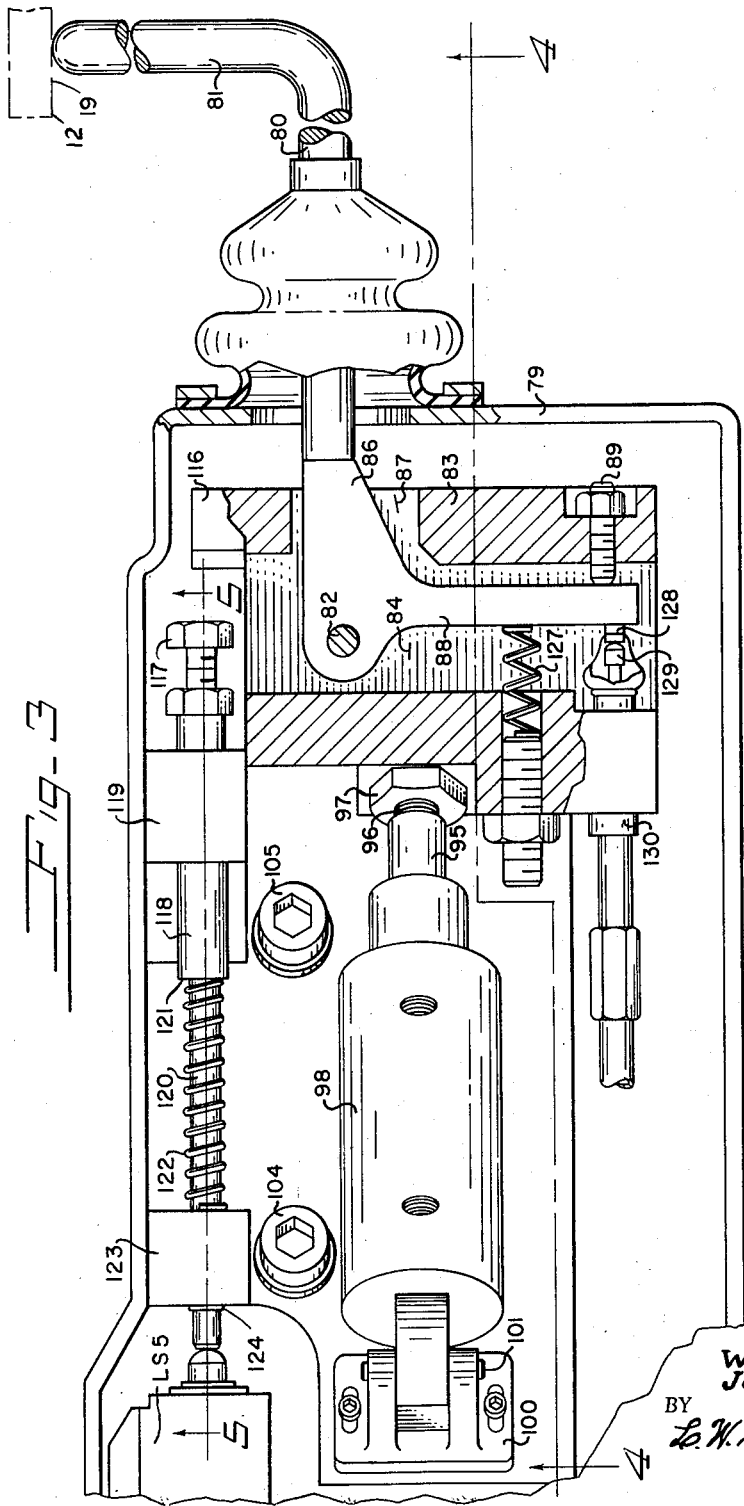

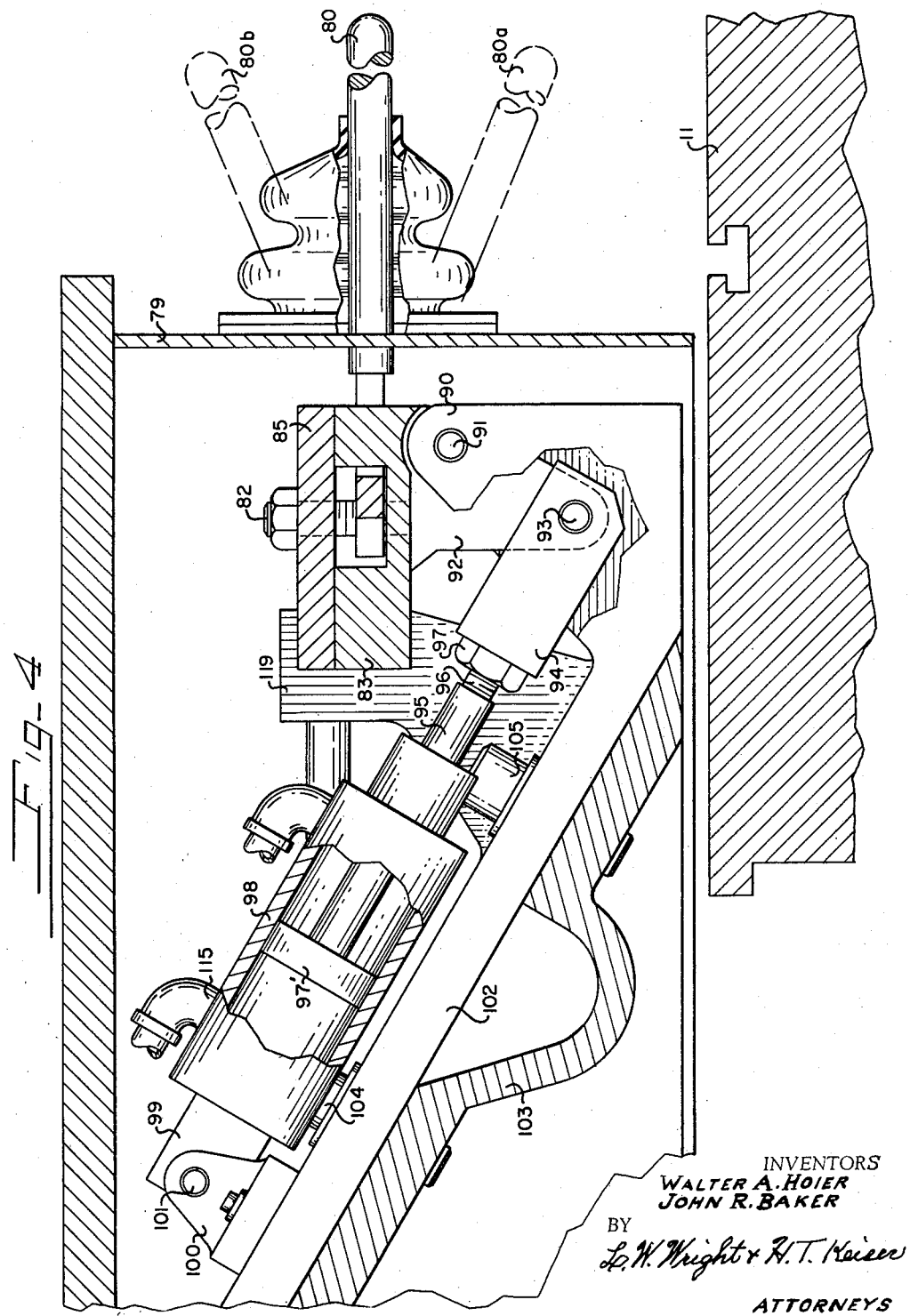

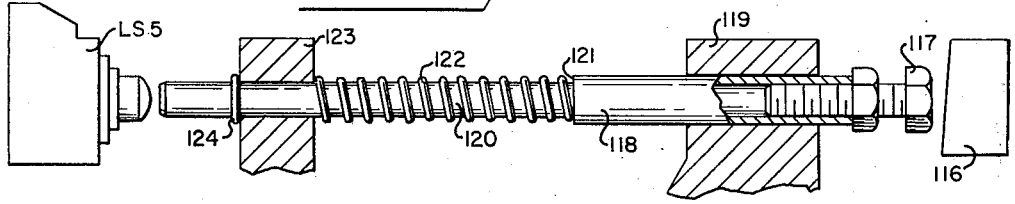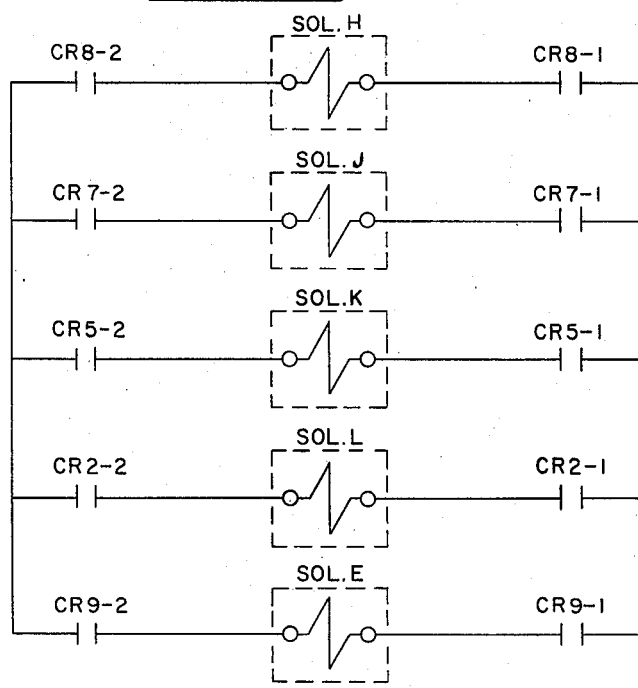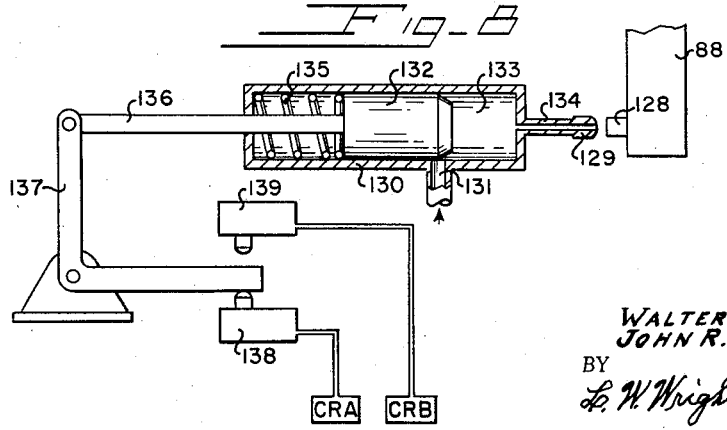

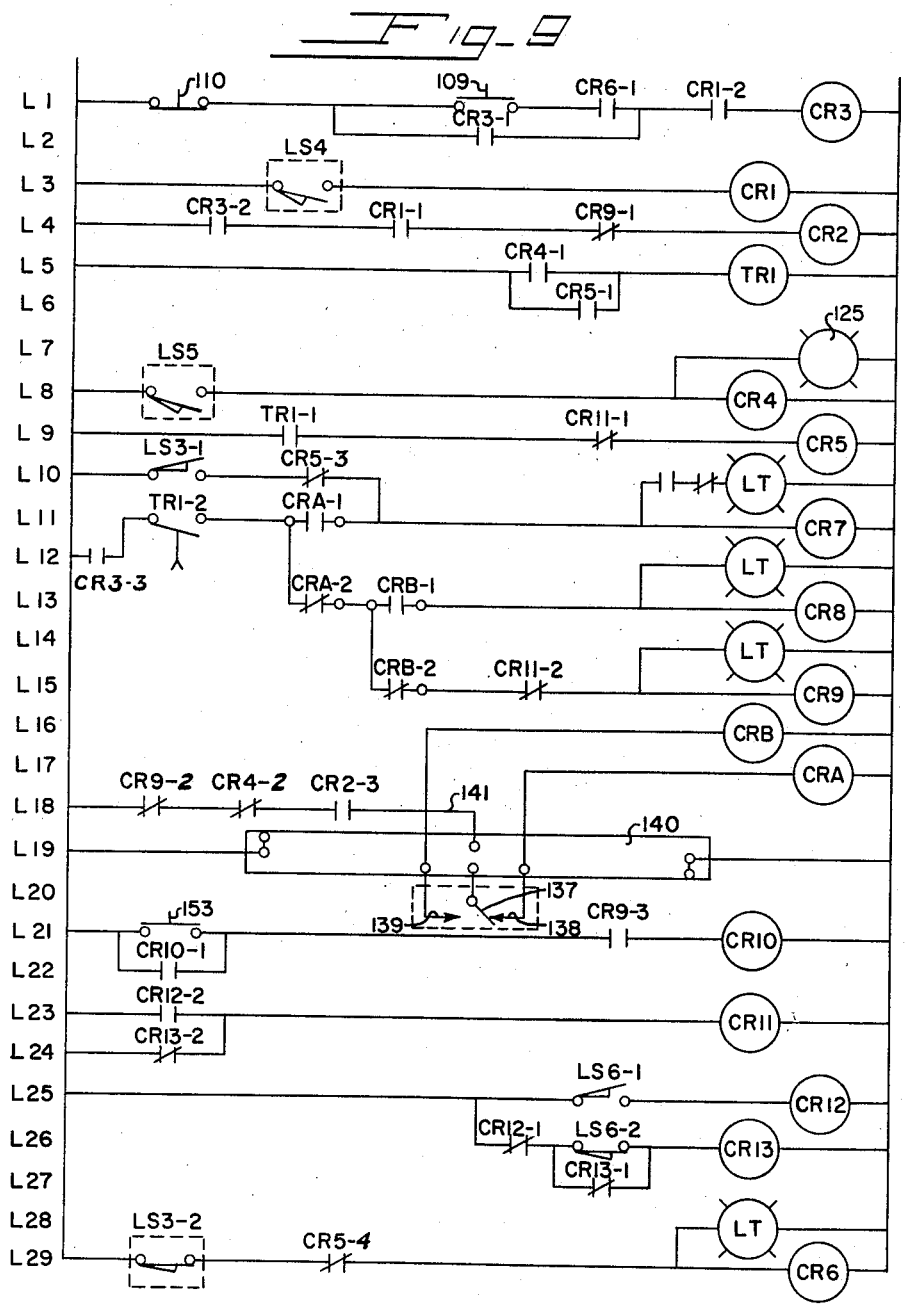

United States Patent Office 2,902,798
Patented Sept. 8, 1959

2,902,798

AUTOMATIC TABLE POSITIONING MECHANISM FOR GRINDERS

Walter A. Hoier and John R. Baker, Cincinnati, Ohio, assignors to The Cincinnati Milling Machine Co., Cincinnati, Ohio, a corporation of Ohio Application April 25, 1957, Serial No. 655,108

3 Claims. (Cl. 51—95)

This invention relates to automatic work slide positioning mechanisms for machine tools and the like wherein the variable position of the work on the slide is utilized to control the position of the slide with respect to a cooling element of the machine.

In the metal working industry, it is common practice to utilize a slide, such as a work table, for positioning work in some accurate prescribed relation with respect to a tool in order to perform a machining operation at some definite precise position on the work. In the usual case, the work is precisely located on the work support, and each successive work piece is located in that same position so that by accurately positioning of the table, the work will always be in the correct location with respect to the tool.

In certain types of machines where the work is rotated or supported by means of center holes in the ends of the work piece, the successive work pieces are not always located in exactly the same position on the work support due to variations in the size or shape of the center holes. In such cases it is obvious that positioning the work table in the same position each time will not always position the work itself in exactly the same position with respect to a tool. As an example, this condition pertains in center type grinding machines, and therefore it becomes necessary to utilize some other means for locating the table due to the variable position of the work thereon.

This invention is contrived to utilize some surface on the work piece itself as the reference surface or locating means to position the work in accurate relation to the tooling element. Such a surface may be a shoulder on a work piece, and by means, exterior and independent of the work table, the shoulder is utilized as the control means for accurately positioning the table with respect to the tooling element, so that the tooling element will form the desired surface in some precise position on each work piece. This calls for a variable position of the work table. Even the surface to be ground may be utilized as the reference surface.

One of the objects of this invention is to provide a new and improved automatic table positioning mechanism which locates the table with respect to a tooling element directly from a surface on the work regardless of the position of the work on the table.

Another object of this invention is to provide a flag stop mechanism which may be mounted on a fixed part of a machine in definite relation to a tooling element on the fixed part and adjacent a movable slide thereof and having a flag adapted to be engaged by a reference surface on the work as the slide moves toward the flagging mechanism and which will provide a signal to stop and clamp the slide in a prescribed position with respect to the tooling element.

A further object of this invention is to provide an automatic control mechanism of the character described wherein the work table is returned to and starts from a remote position with respect to a proper grinding position, is moved automatically to the proper grinding position and clamped, and after the grinding operation is completed, will be automatically returned to its remote position.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a plan view of the flagging mechanism as viewed on the line 3—3 of Figure 2.

Figure 4 is an elevational view of the flagging mechanism as viewed on the line 4—4 of Figure 3.

Figure 5 is a detail section taken on the line 5—5 of Figure 3.

Figure 6 is a diagram of the solenoid control circuit.

Figure 8 is a diagram of the flagging control circuit.

Figure 9 is a diagram of the electrical control circuit for the machine.

Figure 1:
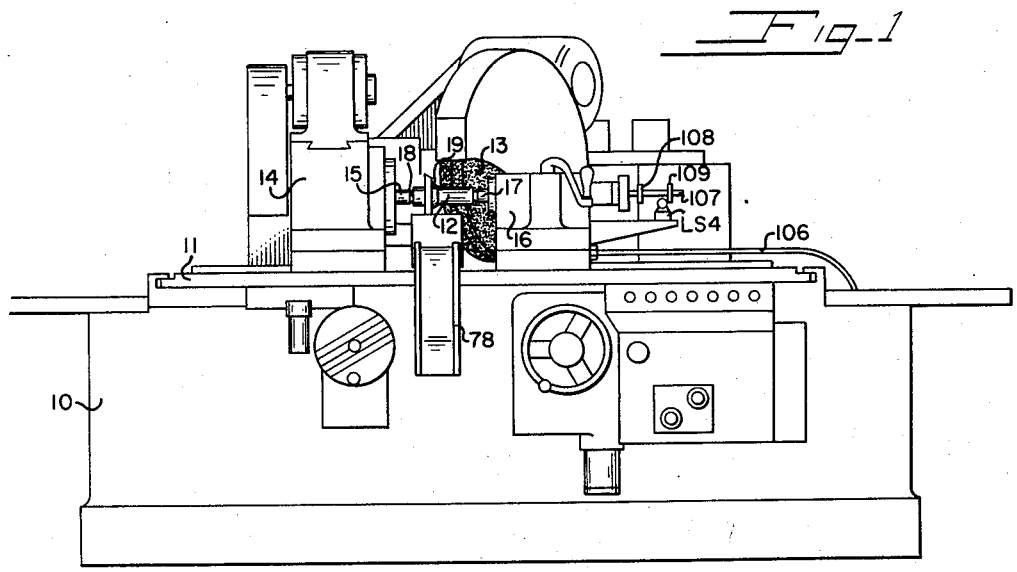
Figure 1 is a front elevation of a machine tool embodying the principles of this invention.

Referring to Figure 1 of the drawings, there is shown a grinding machine as representative of a machine to which the principles of this invention have been applied. In this figure the reference numeral 10 indicates the base or bed of the machine upon which a slide 11 is reciprocably mounted and which serves as a work support for rotatably supporting and positioning a work piece thereon, such as 12, relative to a tooling element, such as the grinding wheel 13.

For purposes of rotatably supporting the work 12, the slide 11 is provided with a conventional headstock 14 having a headstock center 15, and a tailstock 16 having a tailstock center 17. It will now be obvious that if the center hole 18 in the end of the work piece 12 varies in depth from work piece to work piece, that the axial position of the work will shift and the position of the shoulder 19, for instance, of the work pieces will be in different positions axially with respect to the table and the tooling element.

Thus, to utilize a positive stop on the bed, for positioning the work support and thereby each work piece, would be inadequate for accurately positioning the shoulder 19 with respect to the grinding wheel. By means of this invention, the shoulder 19 may be utilized as a reference surface for positioning the table, with the result that the shoulder 19 is always in the same position with respect to the grinding wheel, and the table will be in whatever position is necessary to produce this result. It will be understood that the shoulder 19 is merely illustrative of some surface on the work which may be utilized for position control purposes.

Such a control for accurately positioning the work in the first instance, rather than the table is very important in certain types of grinding operations, one of which is illustrated wherein the grinding wheel, such as the grinding wheel 13, is provided with an angular or V-shaped grinding face, the included angle of which may be 90 degrees for illustrative purposes, and the grinding wheel is mounted for movement in a path at 45 degrees to the work axis, so that one face of the wheel will grind a diameter on the work piece, and the other face will simultaneously grind a shoulder normal to the axis of the work. This means that as the grinding wheel feeds along the 45 degree path, the diameter of the work is being reduced and simultaneously the shoulder is being ground so that the face thereof is receding in an axial direction. As soon as the grinding wheel stops feeding, which is usually controlled by a fixed positive stop, the location of the shoulder axially of the work is finally determined. Since the stop for the infeeding movement is in a fixed position on the machine, the grinding face which grinds the shoulder will always end up in the same position axially of the work, and the work must be so positioned with respect to the grinding wheel that the shoulder being produced will be precisely located with respect to the reference surface and other parts of the work. This amounts to grinding a corner on the work.

Figure 2:
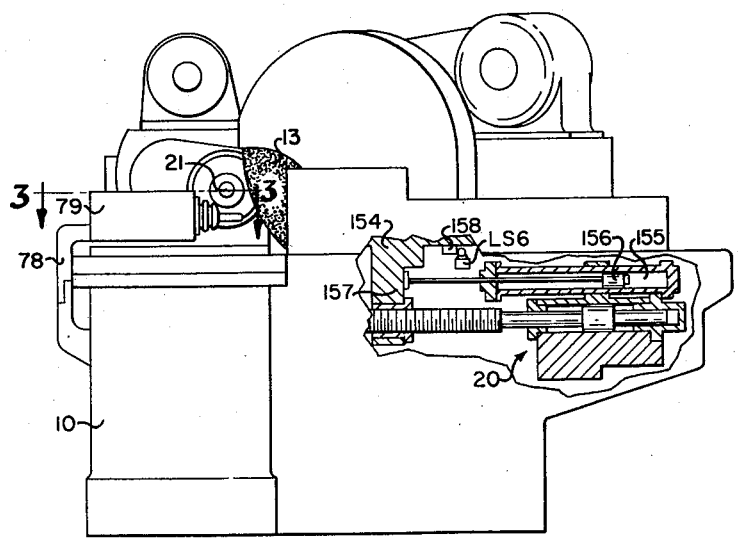
Figure 2 is a side view, partly in section, of the machine shown in Figure 1 as viewed from the right hand side of that figure.

It will be understood that the infeeding mechanism for the grinding wheel, shown in Figure 2, and indicated generally by the reference numeral 20 is relatively located in the machine at an angle, such as 45 degrees with respect to the axis 21 of the work, so that it will grind two surfaces simultaneously and at right angles to each other. The infeeding mechanism may be of any type and its particular type does not constitute part of this invention.

Figure 7:
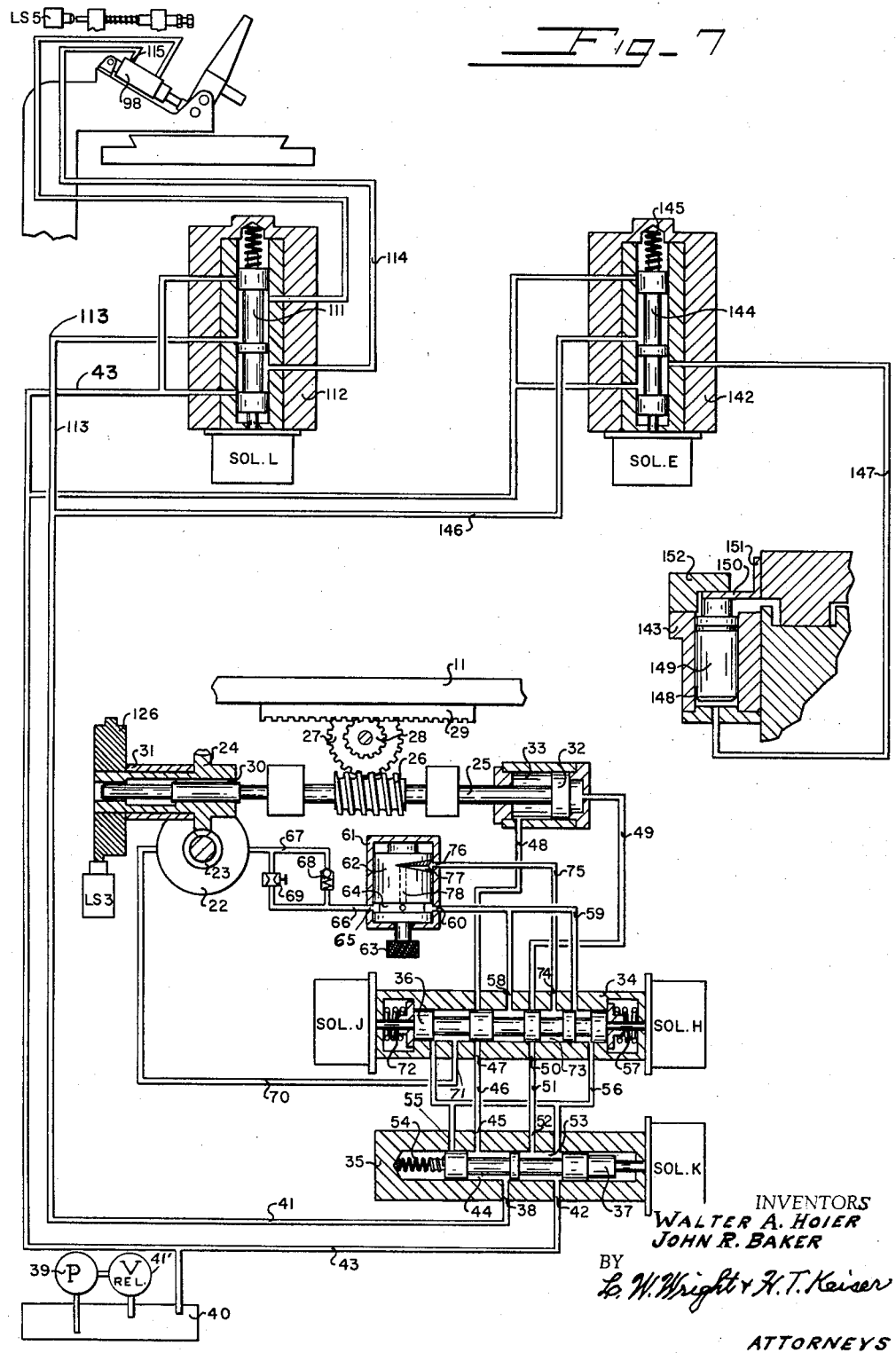
Figure 7 is a diagram of the hydraulic control circuit.

The means for moving the table 11 is shown in Figure 7. By means of this invention the table is started from some retracted or start position, and advances until a flag is actuated by contact with a work surface. The table is then stopped and locked in the desired position. After each work piece is finished, the table retires to its starting position. Power actuation of the table is effected by a rotary hydraulic motor 22 which is operatively connected by means of a worm 23 and a worm gear 24 to a drive shaft 25. This shaft carries a worm 26 which meshes with a worm wheel 27 conventionally journaled in the bed and has operatively connected thereto a spur gear 28 which meshes with a rack 29 formed on the underside of the table 11. The gear 24 is splined at 30 on the shaft 25 because the gear 24 is held against axial movement by a fixed bearing 31 of the machine and thus the shaft 25 may slide axially relative to the gear 24. This structure makes it possible to power traverse the table 11 through actuation of the motor 22, or by manual rotation of the worm gear 23; or the shaft 25 may be directly moved axially to effect a rapid traverse movement.

In the positioning operation of this mechanism, the table 11 starts from a remote position to the left of that shown in Figure 1, in which position, the work is loaded into the machine. It is then contemplated that the table will move at a rapid rate to effect a rapid positioning movement, and then at a feed rate, followed by a very low positioning rate and finally automatically stopped and clamped.

These various actions are performed automatically by means of a piston 32 attached to the end of the shaft 25 and slidable in a cylinder 33, the hydraulic motor 22, and two control valves 34 and 35.

The valve 34 is a three-position rate control valve having a central position for producing the rapid rate, a right hand position for producing the feed rate, and a left hand position for producing the low positioning rate. The valve 35 is a reversing valve. The valve plungers 36 and 37 are shifted by electric solenoids, and when all the solenoids are deenergized the valve plungers are in the position shown. The reversing valve 35 has a pressure port 38 which is supplied by a pump 39 from a reservoir 40 through the supply line 41 having a high pressure relief valve 41' connected thereto. The valve 35 has an exhaust port 42 which is connected by a return line 43 to the reservoir 40. In the position shown, the pressure port 38 is connected by the valve groove 44 to port 45 and line 46 which extends to the annular groove port 47 of valve 34. It will be noted that regardless of the position of the valve plunger 36, fluid pressure will flow around the annular groove 47 to channel 48 and thereby to the left end of cylinder 33, holding the piston 32 in a retracted position.

The exhaust line 49 from the cylinder 33 is connected by way of the annular groove port 50 in valve 34, and channel 51 to port 52 of valve 35 in which the valve groove 53 is positioned to connect the port 52 to the exhaust port 42 of the valve 35. This means that the table is held in its loading position which is to the left of its grinding position. When the solenoid K is energized the valve plunger 37 is shifted to the left against the resistance of spring 54, thereby connecting the pressure port 38 to port 52, and the port 45 to port 55 and thus through channel 56 to the exhaust port 42. Fluid pressure will now flow from port 38 to port 52, channel 51, port 50 of valve 34, and channel 49 to the right hand end of cylinder 33. This will move the piston 32 to the left and through the gearing connection 26—27 cause rotation of the pinion 28 in a clockwise direction and thereby move the table 11 to the right. At this time the worm 26 is held against rotation due to its worm gear connection 23, 24 to motor 22.

When this movement is completed, solenoid J is energized, shifting valve plunger 36 to the right against the resistance of centralizing spring 57, thereby connecting port 50 to port 58 and channel 59. The channel 59 leads to port 60 of a rate control valve 61. This valve has a plunger 62 which is manually adjusted by the knob 63. This valve plunger has an annular groove 64 in constant communication with the port 60 and an opposite port 65 whereby the fluid pressure arriving through channel 59 will continue its flow to channel 66 without interruption. The channel 66 is connected through parallel paths to channel 67 connected to the hydraulic motor 22. In one path there is a check valve 68 which permits flow from the motor but stops flow to the motor. Therefore, the flow to the motor must pass through the second path containing an adjustable flow control valve 69. The adjustment of this valve determines the fast feed rate of the motor 22.

Return fluid from the motor will pass through the line 70 to port 71 of valve 34. Since the plunger 36 is in its right hand position, the port 71 is connected to port 47 and channel 46, which terminates in port 45 in valve 35. Since port 45 is connected at this time to the port 55, the exhaust fluid from the motor will return to reservoir through channel 56 and the annular groove port 42 to channel 43. Actuation of the motor 22 in this manner will cause rotation of the worm 26 in a direction to continue movement of the table to the right at a fast feed rate.

At the proper time the fast feed rate is changed to a slow feed rate by deenergization of solenoid J and energization of solenoid H. This will result in the valve plunger 36 being shifted from its extreme right position to one side of center to its extreme left position on the other side of center against the resistance of centralizing spring 72. Fluid pressure will now flow from port 50 in valve 34 by way of valve groove 73 to port 74 and channel 75 to port 76 of the rate control valve 61.

The valve plunger 62 of the rate control valve has a bevel groove 77 which may be adjusted with respect to the port 76 to determine the flow therethrough into the groove. This groove is connected by interdrilling 78 to groove 64. It will now be seen that the resistance at port 76 is added to the resistance of the flow control valve 69 to further slow down the rate of rotation of the hydraulic motor 22, thereby causing the table to move at a very slow feed rate.

The flagging mechanism which controls the rate changes and stoppage of the table during this slow feed rate, is shown in Figures 3 and 4. This mechanism is supported on a bracket 78 shown in Figures 1 and 2 as attached to the bed 10, and is in the form of an angle iron which overlies the table 11 with a small amount of clearance whereby the table is free to slide underneath and relative to the bracket.

As shown in Figures 3 and 4, the bracket carries a housing generally indicated by the reference numeral 79, and the housing is of boxlike construction. Projecting from this housing towards the work is a flag 80 in the form of a bell crank, and one leg has a bent finger 81 which is adapted to engage the locating surface 19 on the work 12. The flag is pivotally mounted on a pin 82 which is mounted in a support 83. The support has a recess 84 formed in the top of it and extending crosswise thereof, in which is mounted the flag for swinging movement. This recess is enclosed by a cover plate 85 as shown in Figure 4. One leg 86 of the flag passes through the opening 87 formed in the support 83, and the other leg 88 of the flag passes through the opening 84, and the swinging movement of the flag in one direction is limited by an adjustable set screw 89 threaded in the support 83.

The support 83 is mounted for pivotal movement in a vertical plane and is mounted between bifurcated arms extending upward from a base plate, one of the arms being indicated by the reference numeral 90 in Figure 4, and this arm carries a pivot pin 91 which extends into the support 83 and thereby guides it for pivotal movement. The support 83 has an integral crank arm 92 projecting downward therefrom and is connected by a pin 93 to a clevis 94 attached to the end of a piston rod 95. The piston rod is threaded at 96 in the clevis for adjustment purposes and locked by a nut 97.

The piston rod is connected to a piston 97' which is slidably mounted in a cylinder 98, which cylinder has an arm 99 extending therefrom into a clevis block 100 which supports a pin 101 that passes through the member 99 forming a pivotal support for one end of the cylinder. It will now be obvious that if fluid pressure is admitted to the cylinder that the flag may be moved up or down as viewed in Figure 4. In the operation of the device the flag is usually in its lowered position indicated by the reference numeral 80a during the grinding operation, and during the positioning movement it is raised to the position 80b.

The cylinder and flagging mechanism are mounted on a base plate 102 which, in turn, is bolted to a cross plate 103 by suitable bolts 104 and 105.

The automatic operation of the machine will be explained in connection with the electrical circuit shown in Figure 9. The center 17 of the tailstock 16 is adapted to be advanced and retracted by any suitable means, such as hydraulic means, through the hydraulic connections 106, in which case once the spindle is retracted it will remain in that position until the operator inserts a work piece in the machine and causes advance of the tailstock spindle to hold the work in position. The tailstock spindle has a rod 107 extending rearwardly therefrom and movable therewith, and this rod carries dogs 108 and 109 spaced thereon whereby upon advance of the rod 107 the limit switch LS4 will be operated which insures the work piece has been located in the machine before the automatic cycle starts.

Attention is invited to the fact that the worm gear 24 has a cam plate 126 integral therewith, which is in a position to close a limit switch LS3 when the parts are in starting position.

The closing of limit switch LS4, shown in Figure 9, operates the control relay CR1 in line L3, which closes switch CR1–2 in L1 and CR1–1 in L4. The operator then starts the cycle by pressing the starting control switch 109 in line L1 through closed interlock switch CR6–1 and CR1–2 to the cycle starter relay CR3. This line also has a stop switch 110 serially arranged therein. The relay CR3 closes its latching contact CR3–1 around the starting switch 109 to hold the relay latched in, and CR3–3 in L12. The starting relay also closes contact CR3–2 in line L4 to complete a circuit to the flag control relay CR2 which, in turn, closes contacts CR2–1 and CR2–2 in Figure 6 to solenoid L. This solenoid is shown in Figure 7 and effects shifting of valve plunger 111 of reversing valve 112 upward to connect the pressure line 113 to channel 114 to port 115 of flag operating cylinder 98. Relay CR2 also closes contact CR2–3 in L18 to complete a circuit through normally closed switches CR9–2 and CR4–2 in 141 to cock the electronic gauge 140.

This electronic gauge 140 is manufactured by the Federal Products Corp. and known as model 133M109. It has an electronic circuit of such a nature that it must be cocked or triggered, and when it is, it completes a circuit to both relays CRA and CRB through line 141. When relay CRA is energized, it closes contact CRA–1 in L11 and opens CRA–2 in L13. Likewise, energization of relay CRB closes contact CRB–1 in L13 and opens CRB–2 in L15. Thus, the flag is raised to its position 80b shown in Figure 4.

When the flag has been raised to this position, it operates limit switch LS5 shown in Figure 5 by a plunger mechanism. The swinging support 83 shown in Figure 3 has a lug 116 projecting therefrom which is adapted to engage the end of a set screw 117. The set screw is threaded in the end of a rod 118 which is slidable in a guide block 119 which is fixed to the flagging fixture. The rod 118 has a reduced portion 120 forming a shoulder 121, and a spring 122 surrounds the reduced portion 120 in engagement at one end with the shoulder 121, and at the other end with a second fixed guiding block 123. The spring maintains the rod shifted to the right, and a ring 124 mounted in a groove on the reduced portion 120 limits the movement in one direction. When the lug 116 engages the rod 118 it is shifted to effect operation of the limit switch LS5. This insures that the flag has been raised to operative position, and as shown in Figure 9, the closing of the limit switch LS5 in line L8 effects operation of the control relay CR4 and also lights the light 125.

Operation of the relay CR4 closs its contact CR4–1 in line L5 and energizes timer relay TR1 and opens contact CR4–2 in line 18, which does not affect the gauge circuit after it is cocked. The timer relay immediately closes contact TR1–1 in line L9, but time closes contact TR1–2 in line L11. The closing of contact TR1–1 immediately effects operation of control relay CR5 which closes contacts CR5–1 and CR5–2 in Figure 6 to effect energization of solenoid K. As described in connection with Figure 7, the operation of solenoid K causes the table to advance at a rapid traverse rate from its remote position. Relay CR5 also opens its normally closed contact CR5–3 in L10.

It will be understood that the table 11 shown in Figure 1 is in a return or remote position with the cam plate 126 thereon in engagement with a limit switch LS3 which holds its contact LS3–2 in line 29 closed and LS3–1 in line 10 open. As shown in Figure 9, switch LS3–2 has been held closed and switch CR5–4 is normally closed which completes a circuit to control relay CR6, the energization of which held the switch CR6–1 in line L1 closed, which made it possible to start the automatic cycle and acts as an interlock to insure the table is retracted before starting a cycle. However, when relay CR5 is energized, it opened CR5–4, deenergizing relay CR6 and opening contact CR6–1 in L1. The table now advances at a rapid traverse rate, and after a predetermined timed movement the timed contact TR1–2 in line 11 closes. By adjusting the timer relay the length of advance at rapid traverse can be adjusted and determined. The contact CR3–3 in line L12 has been closed by the starting relay CR3 and switch CRA–1 was closed by the cocking of the electronic gauge, and so a circuit is completed by the closing of TR1–2 to control relay CR7 which, in turn, closes contacts CR7–1 and CR7–2 in Figure 6 to energize solenoid J. This solenoid, as explained in connection with Figure 7, initiates a fast feeding movement of the table, by shifting valve 36 to the right and starting rotation of hydraulic motor 22.

Rotation of the motor 22 also rotates the cam plate 126 and releases limit switch LS3 which opens its contact LS3–2 in L29 and closes switch LS3–1 in L10, but CR5–3 is open.

The table now moves at a fast feed rate until the flag 81 shown in Figure 3 engages the reference surface 19 on the work, at which time the lever 88 will be rocked about its axis 82. The lever 88 is normally held in contact with a positioning stop 89 by means of a spring 127 so that a lug 128 uncovers a nozzle 129 of an air gage device 130. The principle of operation of this device is more easily explained in connection with Figure 8 in which it will be seen that the device has a port 131 which is supplied by air pressure and a valve plunger 132 having a tapered end, partially closing the pressure port 131, causing a resistance to flow and a drop in pressure of the air in chamber 133. This air passes through a pipe 134 in the end of which is the nozzle 129 which is partially closed by the member 128, thereby causing a further flow resistance to the escape of air to atmosphere.

Due to the serial resistances, the pressure in the chamber 133 can be adjusted to a definite pressure with respect to the pressure of a spring 135 whereby the plunger 132 is held in the position shown. The operation is such that as the lever 88 is pivoted, it increases the resistance at the nozzle 129 whereby the pressure in the chamber 133 increases, which overcomes the force of the spring 135, and moves the valve plunger 132 backward to the left, thereby opening the port 131 and effecting a further increase in pressure in the chamber 133. The result of all this is that a lever 136 on the end of the valve plunger rotates a bell crank switch member 137 which is laid between two contacts 138 and 139. Normally, it will be seen that the bell crank 137 engages the contact 138.

When the bell crank 137 is moved out of contact with the switch 138, relay CRA becomes deenergized, thereby opening CRA–1 and closing CRA–2. This deenergizes control relay CR7, opening contacts CR7–1 and CR7–2 in Figure 6 and deenergizing solenoid J. At the same time, the closing of CRA–2 completed a circuit through CRB–1 to relay CR8, and as shown in Figure 6, closes contacts CR8–1 and CR8–2 to energize solenoid H. As explained in connection with Figure 7, the energization of solenoid H produces a very slow feed rate. This slow feed rate eventually completes the movement of the switch member 137 into engagement with contact 139, thus deenergizing relay CRB. This results in the opening of contact CRB–1 in line 13, deenergizing solenoid H, whereby the plunger 36 is centralized in a stop position, and the closing of contact CRB–2 in line L15, thereby completing a circuit to control relay CR9. As shown in Figure 7, contacts CR9–1 and CR9–2 will close and energize solenoid E which, as shown in Figure 7, controls the valve 142 to the table clamp 143, which effects clamping of the table in grinding position. Operation of relay CR9 will open normally closed contact CR9–1 in line 4 and deenergize relay CR2 and connected solenoid L, allowing the flag to drop out of the way preparatory to the grinding operation.

The valve 142 in Figure 7 has a plunger 144 which is shifted by the solenoid E against a spring 145 to connect the pressure line 146 to line 147 connected to the bottom of the cylinder 148 containing the clamping plunger 149. The plunger 149 clamps the leg 150 of the angle iron 151 attached to the side of the table against an anvil 152 integral with the clamping device 143.

When the flagging device drops it opens limit switch LS5 in L8 and releases relay CR4. The relay opens contacts CR4–1 in L5, but CR5–1 is still closed, maintaining energization of relay TR1.

Operation of relay CR9, which effected clamping of the table, also results in the opening of contact CR9–2 in L18, thereby breaking the circuit to the electronic device 140 and requiring the circuit to be cocked again before operation on the next cycle. The dropping of the flag also causes the switch 137 associated with the device 140 to return to its starting position, but this produces no effect because the control circuit is dead.

With the table clamped in grinding position, the operator starts the automatic grinding cycle by pressing the start button 153 in L21 to energize relay CR10, but in this circuit is a contact CR9–3 which is closed at this time due to the operation of the table clamping relay CR9. The relay latches itself in by closing its latching contact CR10–1 around the start button 153.

The mechanism for effecting the grinding cycle may be any conventional automatic infeed grinding mechanism, that shown in Patent 2,641,876 being satisfactory for present purposes. However, when the grinding wheel slide returns after the infeed grinding operation it sets up a signal automatically to return the work table to its starting position. This is accomplished by the following circuit connections.

Upon initiation of the grinding cycle, the grinding wheel slide 154, shown in Figure 2, advances, as for example, by introduction of fluid pressure into chamber 155 containing piston 156 which is operatively connected at 157 to the grinding wheel slide. The slide 154 carries a dog 158 which, when the slide is in a return position, operates a limit switch LS6 and holds it in an operated position. The limit switch has two contactors LS6–1 in L25 and LS6–2 in L26. When the dog is in operative contact with the limit switch, it holds the contactor LS6–1 in an open position as shown, and the contactor LS6–2 in a closed position.

The relay CR12 in L25 which is controlled by LS6–1 has a switch CR12–1 in L26 which is normally closed when the relay is deenergized. It will now be seen that there is a complete circuit from L25 through normally closed contact CR12–1 and closed contactor LS6–2 to relay CR13 which is thus energized and which holds its latching contact CR13–1 closed around the contactor LS6–2. The relay CR13 due to its energization, also holds its contact CR13–2 in L24 closed, thereby completing a circuit to control relay CR11 in L23. It is the energization of relay CR11 which has maintained the contact CR11–1 in L9 and CR11–2 in L15 closed during the positioning and clamping of the table. These last two sets of switches, i.e., CR13–1, CR13–2, and CR11–1 and CR11–2 are not normally closed switches but have been indicated as closed because they are only momentarily open and to simplify the explanation of the circuit.

When the grinding wheel slide 154 advances and leaves the limit switch LS6, the contactor LS6–2 in L26 opens first, but this produces no effect on the circuit; and then LS6–1 closes, causing operation of relay CR12. This relay closes CR12–2 in L23 and opens CR12–1 in L26. The opening of this last contact deenergizes relay CR13 which opens its latching contact CR13–1 in L27 and also opens its contact CR13–2 in L24, but the relay CR11 is still held due to the closing of CR12–2.

When the grinding wheel has completed its grinding cycle and returns to the starting position, the dog 158 again operates the limit switch LS6. The switch LS6–1 opens first and deenergizes relay CR12, which opens contact CR12–2 in L23, deenergizing the relay CR11. This finally results in the opening of the contact CR11–1 in L9 and CR11–2 in L15, the latter deenergizing the table clamping control relay CR9 and thus releasing the table clamp. The relay CR12 also closes its contact CR12–1 in L26 and then LS6–2 closes, thereby energizing relay CR13 which closes its latching contact CR13–1 and contact CR13-2 in L24, thus reenergizing relay CR11. It will now be seen that this part of the control circuit is back to its starting position.

The opening of contact CR11-1 and CR11-2 is the signal that the grinding cycle has been completed, and it is now time to return the work table to its starting position. The table clamp has been removed or released, and the momentary opening of CR11-1 deenergizes relay CR5. This relay controls the solenoid K shown in Figure 7, and the reversing valve plunger 37 operated thereby returns to the position shown in the drawings, thereby admitting fluid pressure to the cylinder 33 through channel 48 to cause rapid movement of the piston 32 to the right.

The relay CR5 opens contact CR5-1 in L6, deenergizing relay TR1 which opens contact TR1-1 in L9 which allows CR11-1 to close again without operating relay CR5. The relay TR1 also opens its contact TR1-2 in L11, thereby breaking the circuit to CR11-2 in L15, allowing that contact to reclose without causing operation of relay CR9.

Attention is invited to the fact that the limit switch LS3 associated with the cam on the end of shaft 25 was released when the motor 22 effected the fast and slow positioning movements. Due to the release of this limit switch one of its contactors LS3-1 in line 10 closes, and the other contactor LS3-2 in L29 opened. The contact LS3-1 has remained closed throughout the positioning movement, and so when the relay CR5 was operated it opened its normally closed contact CR5-3 in L10 and kept this part of the circuit open until the present release of solenoid CR5 whereby its contact CR5-3 returned to its normally closed position. This completed a circuit through L10 to L11 and relay CR7. This relay is now energized and through the operation of its solenoid J shifts the valve plunger 36 to connect fluid pressure to motor 22 and cause it to rotate the gearing operated thereby as well as the table back to its starting position.

When it reaches the return position, the cam has rotated to operate limit switch LS3 which opens the contact LS3-1 in L10 and deenergizes relay CR7 and by releasing its solenoid the valve plunger 36 returns to its central position and stops the motor. At the same time, the contact LS3-2 in L29 closes, and since the relay CR5 has just been released it closes its normally closed contact CR5-4 in L29, thus completing a circuit to relay CR6. The relay CR6 closes its contact CR6-1 in series with the start button 109.

The tailstock may now be retracted to remove the work, which will release the limit switch LS4 associated with the tailstock and deenergize the relay CR1, which will open contact CR1-2, thereby breaking the circuit to starting relay CR3 and open its latching contact CR3-1 in L2. It will now be apparent that in order to start another cycle the work must be positioned in the tailstock, and the table must be in its return position as indicated by the contact CR6-1 being closed, whereby the starting button 109 may again energize relay CR3 to start the next cycle.

What is claimed is:

1. In a grinding machine having a bed, a grinding wheel mounted thereon, a work table mounted on the bed for movement toward and from the grinding wheel, the combination with retractable means for securing a work piece longitudinally on the work table, said work piece having a reference surface thereon, of an automatic cycle mechanism for moving the table to position the work in a proper grinding position with respect to the grinding wheel including a flagging device mounted on the bed and having a flag movable to an operative position in the path of movement of a reference surface, a cycle starter, a starting control, means operable by said retractable means to connect said starting control to said cycle starter, and means operable by the starter upon energization thereof to energize said cycle mechanism.

2. In a grinding machine having a bed, a grinding wheel mounted on said bed, a work table mounted on the bed for movement toward and from the grinding wheel, the combination with retractable means for securing a workpiece longitudinally on the work table, said workpiece having a reference surface thereon, of an automatic cycle mechanism for moving the table to position the work in a proper grinding position with respect to the grinding wheel including power operable means to move the table toward the grinding wheel, a flagging device mounted on the bed and having a flag movable to an operative position in the path of movement of a reference surface, a cycle starter, a starting control, means operable by said retractable means to connect said starting control to said cycle starter, means operable by the starter upon energization thereof to energize said cycle mechanism, and means operable by said flag upon engagement by said reference surface to stop said power operable means with the work located in grinding position.

3. In a grinding machine having a bed, a grinding wheel mounted on said bed, a work table mounted on the bed for movement toward and from the grinding wheel, the combination with retractable means for securing a workpiece longitudinally on the work table, said workpiece having a reference surface thereon, and means for clamping the table to the bed, of an automatic cycle mechanism for moving the table to position the work in a proper grinding position with respect to the grinding wheel including power operable means to move the table toward the grinding wheel, a flagging device mounted on the bed and having a flag movable to an operative position in the path of movement of a reference surface, a cycle starter, a starting control, means operable by said retractable means to connect said starting control to said cycle starter, means operable by the starter upon energization thereof to energize said cycle mechanism, and means operable by said flag upon engagement by said reference surface to stop said power operable means with the work located in grinding position and to actuate said clamping means.

References Cited in the file of this patent

FOREIGN PATENTS

| | | |
|---|---|---|
| 709,158 | Great Britain | May 19, 1954 |
| 742,658 | Great Britain | Dec. 30, 1955 |